UNITED STATES PATENT OFFICE.

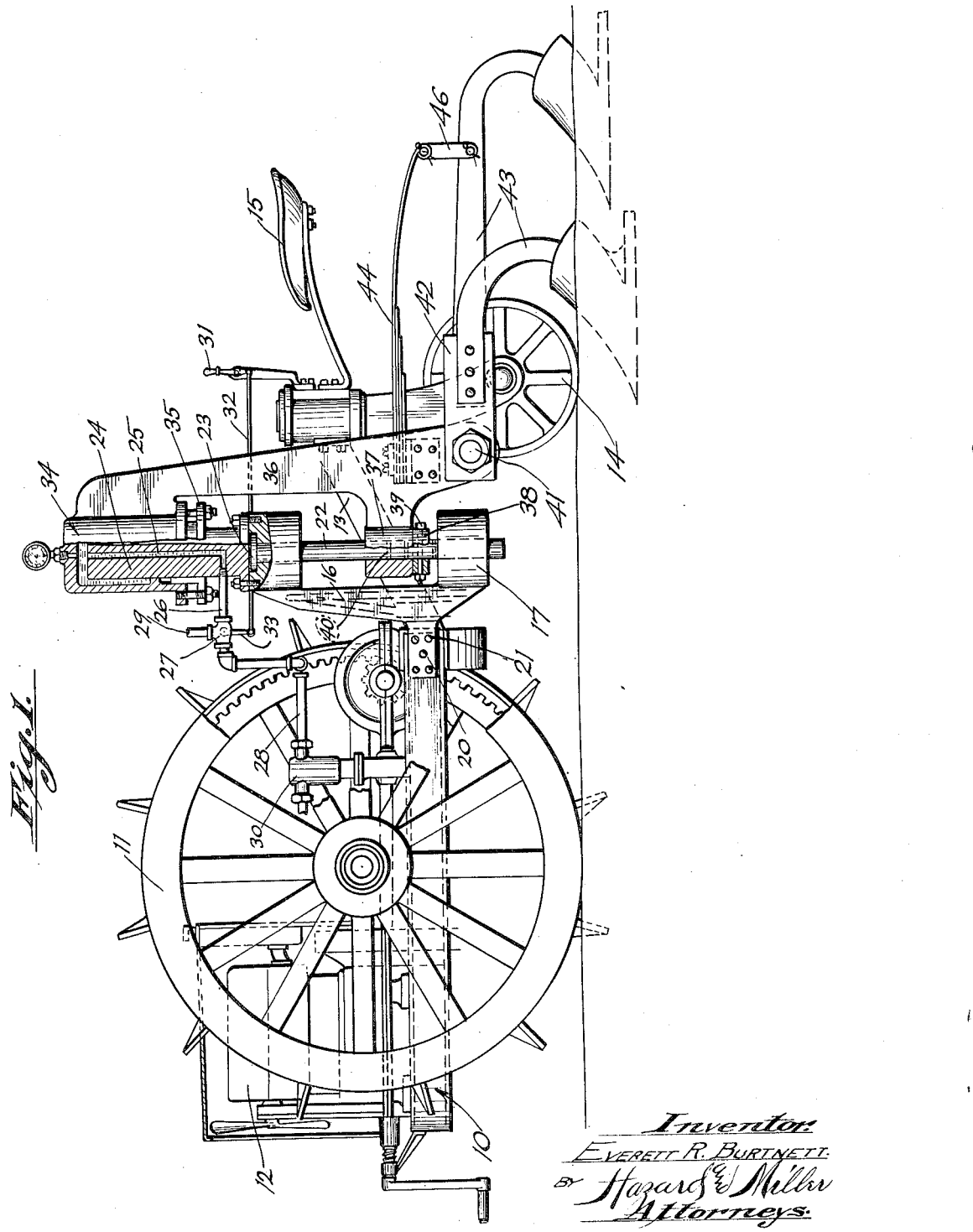

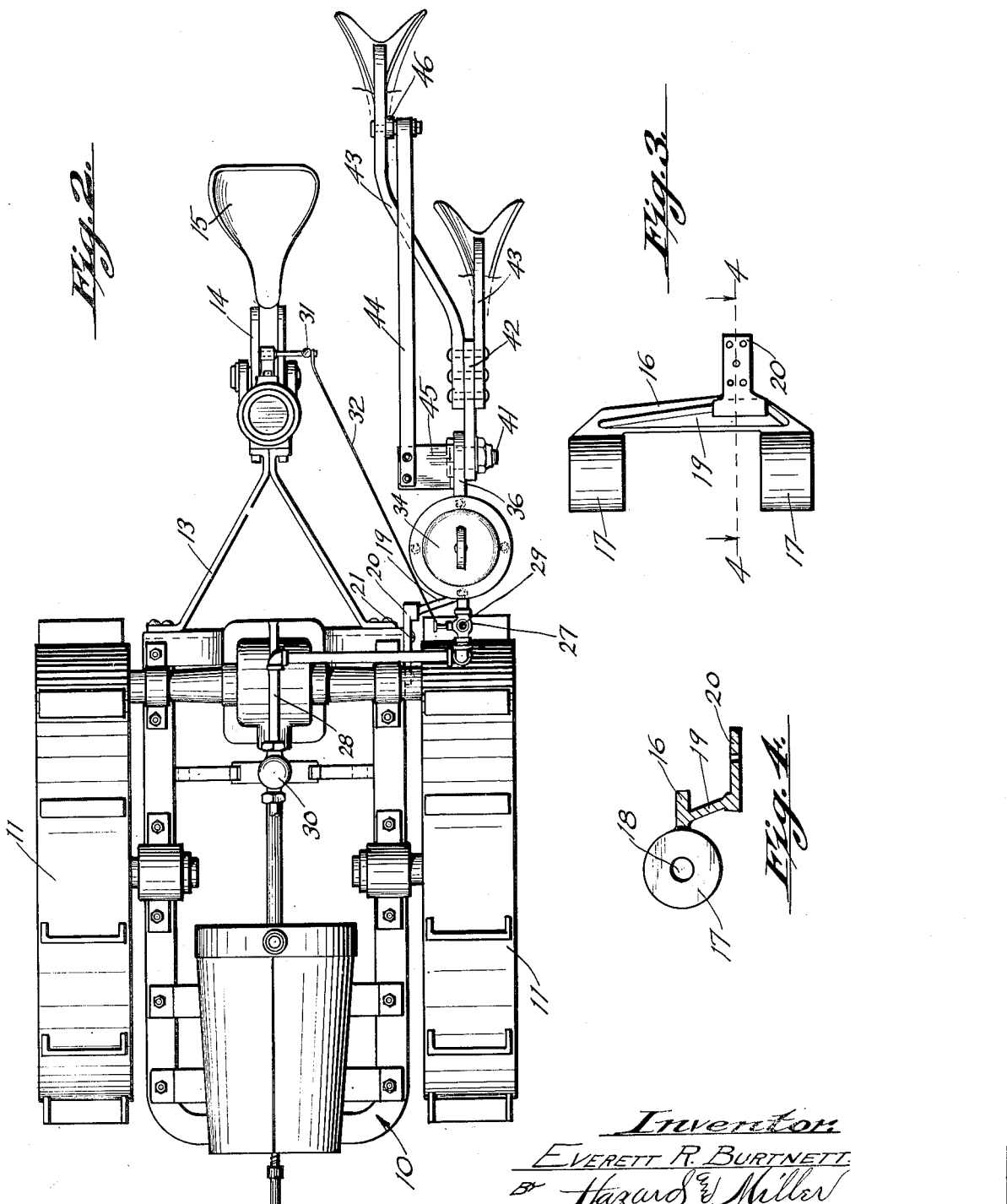

EVERETT R. BURTNETT, OF LOS ANGELES, CALIFORNIA, ASSIGNOR TO GEORGE J. ZIEGLER, OF LOS ANGELES, CALIFORNIA.

POWER-LIFT ATTACHMENT FOR TRACTORS.

1,419,014.   Specification of Letters Patent.   Patented June 6, 1922.

Application filed March 2, 1921. Serial No. 449,087.

*To all whom it may concern:*

Be it known that I, EVERETT R. BURTNETT, a citizen of the United States, residing at Los Angeles, in the county of Los Angeles and State of California, have invented new and useful Improvements in Power-Lift Attachments for Tractors, of which the following is a specification.

My invention relates generally to tractor drawn agricultural implements, and more particularly to a power actuated attachment for tractors, and which is designed for supporting and lifting implements that may be connected to and drawn by said tractors.

The principal objects of my invention are to provide relatively simple and easily controlled means for connecting ground engaging implements, such as plows, to a tractor and regulate the height at which said implements are carried and consequently regulating the depth at which they travel while in the ground, and to provide relatively simple and efficient fluid pressure actuated means for elevating the implement carrying attachment so that when the tractor is driven to and from the points where work is being accomplished, the implements, such as plows, can be raised and carried entirely above the ground.

Further objects of my invention are to provide adjustable means for limiting the downward movement of the attachment and consequently limiting the depth at which the plows or implements engage in the ground, to arrange on the attachment a resilient implement support in the nature of a leaf spring, the same serving to yieldingly support the implements at all times and maintain them in a plane substantially parallel with the chassis of the tractor when suspended above the ground, to provide relatively simple and efficient means that is under ready control of the operator for elevating the implement carrying attachment and likewise permitting the same to move downward for engagement with the ground, and further, to provide a power lift attachment for tractors that is very compact, capable of being applied to practically all tractors, capable of being easily and cheaply produced and arranged upon the tractor so as to be under the ready observance of an operator positioned upon the usual driver's seat.

With the foregoing and other objects in view, my invention consists in certain new and novel features of construction and arrangement of parts hereinafter more fully described and claimed and illustrated in the accompanying drawings, in which:

Fig. 1 is a side elevational view of a power lift attachment of my improved construction, the same with parts in section, being shown applied to a wheeled tractor and the attachment carrying a plurality of plows.

Fig. 2 is a plan view of a tractor and using my improved attachment applied thereto.

Fig. 3 is a side elevational view of a bracket of special form and which is utilized for connecting the attachment to a tractor frame.

Fig. 4 is a horizontal section taken approximately on the line 4—4 of Fig. 3.

Referring by numerals to the accompanying drawings, which illustrate a practical embodiment of my invention, 10 designates the main frame or chassis of a tractor, 11 the main traction wheels, 12 the motor, preferably an internal combustion engine, 13 the rear or auxiliary frame, 14 the trailing or castor wheel that supports the rear portion of the frame and 15 the driver's seat, all of which parts are well-known in tractor construction.

My invention includes a bracket of special form that is directly connected to the main frame or chassis 10 of the tractor, preferably the left hand side rail thereof, and said bracket including a vertically disposed leg 16, having formed integral with its upper and lower ends substantially cylindrical bearing blocks 17 that are provided with axially disposed openings such as 18. Projecting laterally from one side of the leg 16 of this bracket is a vertically disposed web 19, and formed integral with the lower portion thereof is a plate 20 that is perforated in order to receive attaching means such as bolts or rivets 21, and which latter are seated in the tractor frame 10.

The attaching bracket thus formed is preferably constructed of a single piece of metal, either cast or dropped forged. By utilizing a bracket of this construction, the implement carrying attachment is connected to the rear left hand corner of the tractor frame and occupies a position immediately to the rear of the left hand wheel 11, and in front of and slightly to the left of the driver's seat 15.

Rotatably arranged in the vertically aligned opening 18 is a shaft 22, the upper portion thereof being provided with a head 23 that occupies a shallow recess formed in the top member 17 and overlying the head 23 is the lower end of a vertically arranged cylindrical member 24 that performs the functions of a stationary piston.

Formed in cylinder 24 is an axially disposed passageway 25, the lower portion of which is extended outward near the base of said member and connected to the lower end of this passage-way is one end of a tubular member 26 in which is located a valve 27. Leading to this valve from a suitable source of fluid pressure supply is a tubular member 28, and leading from said valve to a storage tank or to the atmosphere, is an exhaust pipe 29. Any suitable means may be provided for supplying the necessary fluid pressure to operate my improved attachment, and in the drawings I have shown pipe 28 connected to a pump or compressor 30, and which latter may be operated either directly or indirectly from the shaft of motor 12. This arrangement is adaptable for use in the event that liquid is utilized as the fluid pressure medium, or if air or gas is used. The latter may be supplied from a suitable storage tank (not shown) and into which air or gas is compressed by a suitably arranged pump or compresser.

Valve 27 is actuated by any suitable means, preferably by a small hand lever 31 that is fulcrumed on a suitable support adjacent to the driver's seat 15, and said lever being connected by a rod 32 and crank arm 33 to the stem of valve 27.

Arranged to slide freely on the stationary piston 24 is a cylinder 34, the lower end of which is provided with a suitable packing gland 35, and formed integral with or fixed to this cylinder is the upper end of a vertically disposed bar 36, the lower portion of which is provided with a forwardly projecting bearing 37 that is loosely mounted on shaft 22 between the bearings 17.

To limit the downward movement of bar 36 and parts carried thereby, a ring or collar 38 is positioned on the lower portion of shaft 22, said ring or collar being vertically adjustable upon said shaft by means of a pin or bolt 39 that passes horizontally through said collar and through any one of a series of horizontally disposed apertures 40 that are formed in the lower portion of said shaft. Pivotally connected to the lower end of bar 36 by means of a horizontally disposed pin or bolt 41, is the forward end of a rearwardly projecting rail 42, and secured to the latter in any suitable manner are the forward ends of plow carrying beams such as 43. In order to yieldingly support the latter, I provide a leaf spring 44 and rigidly connect its forward end to a bracket 45 that projects laterally from the inner face of bar 36, and the rear end of said spring being connected to the rear portion of one of the plow beams 43 by a link 46.

Under normal conditions, bar 36 and parts carried thereby are free to swing laterally with the shaft 22 and fixed piston 24 as axes, and said bar and carried parts are maintained at the desired elevation by ring or collar 38 upon which bearing 37 rests, and said ring or collar being vertically adjustable upon said shaft 22.

With the parts of the attachment in their normal or lowered positions, the plows carried by the beams 43 will enter the ground and travel therethrough at the desired depth, and while thus operating said plows are yieldingly suspended from leaf spring 44.

When it is desired to elevate bar 36 and parts carried thereby, lever 31 is manipulated to actuate valve 27 so that fluid pressure may pass through pipes 28 and 26 into and through passage-way 25 and into the chamber between piston 24 and cylinder 34, and as a result said cylinder 34, bar 36 and parts carried thereby, including the plow carrying beams 43, will be elevated.

It will be understood that the foregoing operation is brought about when it is desired to raise the plows out of the ground, for instance, while turning the machine at the end of a furrow or while driving the tractor and plows to and from work.

In the event that it is desired to retain the parts in elevated position for any length of time, for instance, while the tractor is being driven to and from a point of use, collar 38 can be raised on shaft 22 after bearing 37 has been elevated and thus said collar will retain bar 36 and parts associated therewith in their elevated positions and relieve the fluid pressure means from strains of supporting said parts.

Bar 36 and the plow carrying beams are free to swing for a limited distance laterally about the vertical axis formed by shaft 22 and fixed piston 24. But under normal operating conditions, or while the plows are in the ground, they will trail the tractor wheel, behind which they are positioned.

Obviously, my improved attachment and power lifting means may be applied to the right hand side of the tractor frame and in some instances it may be desirable to arrange the attachment on both sides of said tractor frame. The position of my improved attachment upon the tractor, or with respect to its frame, enables the driver of the tractor to readily observe, at all times, the action and operation of the plows without the necessity of turning sidewise or to the rear.

My improved attachment is relatively simple, strong and durable, is capable of being easily and cheaply produced, constitutes a separate unit that is adaptable to any form or type of tractor or draft means, and the power lifting means for the attachment is entirely independent of the operating mechanism of the tractor to which it is attached.

The attachment is relatively short, thereby permitting it to be readily turned around with the tractor in a comparatively short space at the end of a field or furrow.

Inasmuch as the plows or ground engaging implements are free to swing radially about a fixed axis, they will automatically adjust themselves and consequently relieve the attaching means of all binding strains.

It will be readily understood that minor changes in the size, form and construction of the various parts of my improved power lift attachment for tractors may be made and substituted for those herein shown and described without departing from the spirit of my invention, the scope of which is set forth in the appended claims.

I claim as my invention:

1. The combination with a tractor frame, of parts secured thereto and constituting a vertically disposed axis, a member swiveled on said axis, a portion of which member is in the form of a cylinder that encloses a part of the axis forming means, means for delivering fluid pressure into said cylinder and ground engaging implements pivotally connected to said swiveled member.

2. The combination with a tractor frame, of parts secured thereto and constituting a vertically disposed axis, a member swiveled on said axis, a portion of which member is in the form of a cylinder that encloses a part of the axis forming means, means for delivering fluid pressure into said cylinder and spring supported ground engaging implements pivotally connected to said swiveled member.

3. The combination with a tractor frame, of parts secured thereto and constituting a vertically disposed axis, a member swiveled on said axis, a portion of which member is in the form of a cylinder that encloses a part of the axis forming means, means for delivering fluid pressure into said cylinder for elevating said swiveled member, means for retaining said swiveled member in its elevated position and ground engaging members connected to said swiveled member.

4. The combination with a tractor, of members connected to the tractor frame and constituting a vertical axis, a ground engaging implement carrying member swiveled upon said axis and fluid pressure means associated with one of the axis forming members and a part of the swiveled member for elevating the latter.

5. The combination with a tractor, of members connected to the tractor frame and constituting a vertical axis, a ground engaging implement carrying member swiveled upon said axis, fluid pressure means associated with one of the axis forming members and a part of the swiveled member for elevating the latter and means for retaining the swiveled member in its elevated position.

6. The combination with a tractor, of members associated therewith and constituting a vertical axis, a member swiveled on said axis forming members and part of which swiveled member encloses a part of one of the axis forming members, means for delivering fluid pressure into the chamber between the enclosing part of the swiveled member and the enclosed part of the axis forming member to elevate said swiveled member and ground engaging implements carried by said swiveled member.

7. The combination with a tractor, of members associated therewith and constituting a vertical axis, a member swiveled on said axis forming members and part of which swiveled member encloses a part of one of the axis forming members, means for delivering fluid pressure into the chamber between the enclosing part of the swiveled member and the enclosed part of the axis forming member to elevate said swiveled member, ground engaging implements carried by said swiveled member and means for retaining the swiveled member in its elevated position.

8. In a power lift attachment for tractors, a pair of vertically disposed members one arranged immediately above the other, an upright frame having a part journaled on the lower one of said members, a cylinder on the upper portion of said frame which cylinder incloses the upper portion of the upper member, said upper member being perforated so as to admit fluid pressure to the chamber between said upper member and the inclosing cylinder, and a ground engaging member pivotally connected to the lower portion of said frame.

9. In a power lift attachment for tractors, a pair of vertically disposed members one arranged immediately above the other, an upright frame having a part journaled on the lower one of said members, a cylinder on the upper portion of said frame which cylinder incloses the upper portion of the upper member, said upper member being perforated so as to admit fluid pressure to the chamber between said upper member and the inclosing cylinder, and a spring supported ground engaging member pivotally connected to the lower portion of said frame.

10. In a power lift attachment for tractors, a pair of vertically disposed members one arranged immediately above the other, an upright frame having a part journaled on the lower one of said members, a cylinder on the upper portion of said frame which cylinder incloses the upper portion of the upper member, said upper member being perforated so as to admit fluid pressure to the chamber between said upper member and the inclosing cylinder, a ground engaging member pivotally connected to the lower portion of said frame, and means for lifting the downward movement of the frame upon said vertically disposed members.

11. A power lift attachment for tractors, comprising a bracket, vertically aligned members carried thereby, a ground engaging implement carrying member swiveled upon said vertically aligned members and fluid pressure actuated means associated with said vertically aligned members and implement carrying member for elevating the latter.

12. A power lift attachment for tractors, comprising a bracket, vertically aligned members carried thereby, a ground engaging implement carrying member swiveled upon said vertically aligned members, fluid pressure actuated means associated with said vertically aligned members and implement carrying members for elevating the latter and means for retaining said swiveled member in its elevated position.

In testimony whereof I have signed my name to this specification.

EVERETT R. BURTNETT.